United States Patent
Sutton et al.

(10) Patent No.: US 9,612,315 B2
(45) Date of Patent: Apr. 4, 2017

(54) METHODS OF AND SYSTEMS FOR EXTRACTING PATTERNS OF HUMAN EXTENT AND DENSITY FROM GEOGRAPHICALLY ANCHORED RADIO SIGNAL SOURCES

(71) Applicant: Skyhook Wireless, Inc., Boston, MA (US)

(72) Inventors: Richard J. Sutton, Cambridge, MA (US); Russel K. Jones, Medfield, MA (US)

(73) Assignee: Skyhook Wireless, Inc., Boston, MA (US)

( * ) Notice: Subject to any disclaimer, the term of this patent is extended or adjusted under 35 U.S.C. 154(b) by 631 days.

(21) Appl. No.: 13/934,717

(22) Filed: Jul. 3, 2013

(65) Prior Publication Data

US 2014/0009339 A1    Jan. 9, 2014

Related U.S. Application Data

(60) Provisional application No. 61/668,542, filed on Jul. 6, 2012.

(51) Int. Cl.
| | | |
|---|---|---|
| *G01S 3/02* | (2006.01) | |
| *G01S 5/02* | (2010.01) | |
| *H04W 64/00* | (2009.01) | |

(52) U.S. Cl.
CPC .......... *G01S 5/0289* (2013.01); *G01S 5/0242* (2013.01); *H04W 64/003* (2013.01)

(58) Field of Classification Search
CPC ........ G01S 3/02; G01S 5/0289; G01S 5/0242; H04W 64/003

USPC .......................................... 342/451, 454, 463
See application file for complete search history.

(56) References Cited

U.S. PATENT DOCUMENTS

| | | | |
|---|---|---|---|
| 7,403,762 B2 | 7/2008 | Morgan et al. | |
| 7,433,694 B2 | 10/2008 | Morgan et al. | |
| 8,031,657 B2 | 10/2011 | Jones et al. | |
| 8,606,294 B2 | 12/2013 | Alizadeh-Shabdiz | |
| 8,644,852 B2 | 2/2014 | Jones et al. | |
| 8,958,401 B2* | 2/2015 | Doppler ................ | H04W 48/16 370/338 |
| 9,031,580 B2 | 5/2015 | Alizadeh-Shabdiz | |
| 9,298,897 B2 | 3/2016 | Broadstone et al. | |
| 9,369,845 B2 | 6/2016 | Alizadeh-Shabdiz et al. | |
| 9,467,807 B2 | 10/2016 | Alizadeh-Shabdiz | |

(Continued)

FOREIGN PATENT DOCUMENTS

SE    WO 9405098 A1 *    3/1994    ............ H04W 16/18

*Primary Examiner* — Harry Liu
(74) *Attorney, Agent, or Firm* — Cesari and McKenna, LLP; James A. Blanchette (57) ABSTRACT

A method of and system for estimating at least one of a human development level and a human activity level. A method of estimating at least one of a human development level and a human activity level includes estimating positions of radio broadcast beacons. The positions of the radio broadcast beacons are stored in an electronically readable catalog. Each of the positions is grouped into sets of positions. Each set of positions includes positions of one or more geographically-related radio broadcast beacons. For each of the sets, at least one of a human development level and a human activity level is estimated for an area encompassing the positions of the set.

30 Claims, 3 Drawing Sheets

(56) References Cited

U.S. PATENT DOCUMENTS

| | | | |
|---|---|---|---|
| 2007/0004428 A1 | 1/2007 | Morgan et al. | |
| 2007/0142065 A1 | 6/2007 | Richey et al. | |
| 2007/0218870 A1* | 9/2007 | Satoh | G01S 3/72 455/404.2 |
| 2008/0176583 A1 | 7/2008 | Brachet et al. | |
| 2008/0318596 A1* | 12/2008 | Tenny | G01S 5/0205 455/456.2 |
| 2009/0047909 A1* | 2/2009 | Yamada | H04W 64/003 455/67.11 |
| 2010/0323716 A1* | 12/2010 | Jaffri | G06Q 30/02 455/456.1 |
| 2011/0191052 A1* | 8/2011 | Lin | G01C 25/00 702/94 |
| 2011/0295577 A1 | 12/2011 | Ramachandran | |
| 2013/0165168 A1* | 6/2013 | Jintaseranee | H04W 24/08 455/507 |

* cited by examiner

FIG. 3

METHODS OF AND SYSTEMS FOR EXTRACTING PATTERNS OF HUMAN EXTENT AND DENSITY FROM GEOGRAPHICALLY ANCHORED RADIO SIGNAL SOURCES

CROSS-REFERENCE TO RELATED APPLICATIONS

This application claims priority to U.S. Provisional Application No. 61/668,542, entitled Methods of and Systems for Extracting Patterns of Human Extent and Density from Geographically Anchored Radio Signal Sources, filed Jul. 6, 2012, the contents of which are incorporated by reference herein.

BACKGROUND OF THE INVENTION

1. Field of the Invention

The invention generally relates to the field of geographic change detection and feature extraction, and to a method for using collections of radio signal beacons to define and monitor the shape and extent of human development and cultural activity.

2. Description of Related Art

Boundaries that accurately describe the extent and density of human presence are an important component of the functional processes of many organizations. These include civil and military governmental units as well as non-governmental entities, commercial organizations and individuals. Accurate land use and cultural characterizations are vital for urban planning, public safety and asset management. These boundaries are generally maintained and implemented using geographic information systems and provide analytical geometry for resource deployment and logistics optimization.

While various sources of and processes for determining the extent and density of the built environment are currently in use, these are either only selectively available or prohibitively expensive to acquire and maintain to desired levels of accuracy. Comprehensiveness and consistency are especially problematic across political borders, and few methods exist for capturing change simultaneously with global extent.

One technique to acquire these data is through population density models. Weaknesses of population density models are that they are usually census-sourced or coarsely sampled, they are generally allocated from larger to smaller areas based on official national or regional counts, and they are maintained to high accuracy in only a very small subset of overall developed areas.

Another source of these data is the acquisition of remotely sensed, spectrally extracted features. Weaknesses of this approach are that it is non-uniform and incomplete at global scales, it must be acquired by specific satellite mission (e.g., Landsat, SPOT, IKONOS, MODIS, Quickbird, WorldView, GeoEye) and post-processed for feature extraction, and its sampling is non-simultaneous.

Another source of these data is satellite-acquired, nighttime light propagation. Weaknesses of this approach are that it is low resolution, excludes naturally illuminated (daylit) areas, and variable density within nighttime lighted areas is difficult or impossible to numerically quantify.

Another technique to acquire these data is feature-based density modeling (e.g., roads, buildings, business and residential address locations). Weaknesses of this approach are that is it non-uniform, selectively available, and expensive to acquire and maintain.

Another source of these data is geocoded utility and network traffic archives. The weakness of this source is that it is selectively available, proprietary, and fragmented.

While the existing models and techniques described above may offer useful information regarding the density of human presence and other geographic features, each also suffers from one or more shortcomings. A superior human extent and density metric may couple the accuracy of spectrally extracted aerial imagery polygons with the immediacy of night time light propagation data, and include quantitative density metrics based on population modeling.

BRIEF SUMMARY OF THE INVENTION

In one aspect, the invention provides methods of and systems for estimating at least one of a human development level and a human activity level.

In another aspect of the invention, a method for estimating at least one of a human development level and a human activity level includes estimating positions of radio broadcast beacons. The method also includes storing the positions of the radio broadcast beacons in an electronically readable catalog. The method further includes grouping each position of a corresponding radio broadcast beacon into sets of positions. Each of the sets includes positions of one or more geographically-related radio broadcast beacons. The method further includes, for each of the sets, estimating at least one of a human development level and a human activity level for an area encompassing the positions of the set.

In a further aspect of the invention, the at least one of the positions of the radio broadcast beacons is estimated by scanning a geographic area for radio signals emitted from radio broadcast beacons using a mobile scanning device.

In yet another aspect of the invention, at least one of the positions of the radio broadcast beacons is estimated using data received from a mobile device, the mobile device having received the data during a process for locating a geographic position of the mobile device.

In still another aspect of the invention, the data received from the mobile device includes the geographic position of the mobile device and a strength of a signal received by the mobile device from a radio broadcast beacon.

In another aspect of the invention, the method for estimating at least one of a human development level and a human activity level further includes determining an attribute of one of the radio broadcast beacons other than position and storing the attribute in the electronically readable catalog.

In a further aspect of the invention, at least one of the sets is determined based on the attribute stored in the electronically readable catalog.

In yet another aspect of the invention, the method for estimating at least one of a human development level and a human activity level further includes estimating a uniform human population density for a geographic area encompassing two or more of the sets, the uniform human population density exceeding a threshold density.

In still another aspect of the invention, the threshold density is determined based on population demographics associated with the geographic area.

In another aspect of the invention, the threshold density is a previously detected density of radio beacons in a second geographic area having a particular land class.

In a further aspect of the invention, the particular land class is estimated using at least one of density of road segments in the area, number of utility connections in the area, or analysis of aerial photographs of the area.

In yet another aspect of the invention, grouping each position includes at least one of density based adaptive tiling, kernel density graphing and vectorization to discrete class thresholds, Voronoi decomposition, gridded feature counts, or volumetric modeling.

In still another aspect of the invention, the method for estimating at least one of a human development level and a human activity level further includes associating at least one of the sets with a named place in geographic proximity to the positions of the at least one set.

In another aspect of the invention, the method for estimating at least one of a human development level and a human activity level further includes comparing at least one of the estimated human activity levels to a previously estimated human activity level for the area encompassing the positions of the group to determine if a difference between the estimated human activity level and the previously estimated human activity level exceeds a difference threshold.

In a further aspect of the invention, at least one of the sets includes only positions located within a single structure.

In yet another aspect of the invention, estimating at least one of a human development level and a human activity level for each set includes using a known correlation between human population densities and radio broadcast beacon density.

In still another aspect of the invention, estimating at least one of a human development level and a human activity level for each set includes categorizing the area encompassing the positions of the set as one of urban, suburban, or rural.

DETAILED DESCRIPTION OF THE EMBODIMENTS

Preferred embodiments of the invention provide methods for estimating human population densities based on the detected positions of radio broadcast beacons. The density and relative positions of these beacons provide a useful proxy for human population. In particular, previously observed patterns of radio beacon deployment in regions of a known type (e.g., urban, suburban, rural) may be used to predict the characteristics of other regions sharing similar patterns of radio beacon deployment. Due to the immediacy of radio broadcast signals, changes in regions can be rapidly detected using these techniques.

The methods and systems set forth herein are related to the techniques disclosed in the following U.S. patents and U.S. Patent Application Publications, each of which are incorporated by reference herein: U.S. Pat. No. 7,403,762 B2, entitled Method and System for Building a Location Beacon Database, filed Oct. 28, 2005; U.S. Pat. No. 8,031,657 B2, entitled Server for Updating Location Beacon Database, filed Aug. 13, 2008; U.S. Patent Publication 2007/0004428 A1, entitled Continuous Data Optimization of Moved Access Points in Positioning Systems, filed Feb. 22, 2006; U.S. Pat. No. 7,433,694 B2, entitled Location Beacon Database, filed Oct. 28, 2005.

As used herein, the term "adaptive tiling" refers to an irregular array of tiles whose sizes vary in order to limit the maximum number of features contained within each tile.

As used herein, the term "built environment" refers to the human-built structures and surrounding amenities comprising human development.

As used herein, the term "geographic information system" refers to a system for managing, measuring and manipulating geographic data in a computerized environment.

As used herein, the term "isoline" refers to a contour line describing a given feature density threshold within a feature set, where density per unit area is uniform.

As used herein, the term "kernel density" refers to a point-to-raster data conversion and smoothing method to produce a continuous mathematical surface from a spatially distributed set of point features.

As used herein, the term "point cloud" refers to a collection of points representing beacon locations that are clustered spatially and/or by data attribute values.

As used herein, the term "radio signal" refers to identifying information broadcast from Wi-Fi and cellular beacons.

As used herein, the term "Voronoi decomposition" refers to a method for converting spatially distributed points to a continuous polygonal surface using bisected distances between features.

As used herein, the term "Wi-Fi" refers to wireless digital data exchange standard that conforms to IEEE 802.11 standards.

Since the advent of inexpensive cell phones and wireless access points in the late 1990s, cellular and Wi-Fi beacons have been deployed across most populations worldwide. As access to the Internet has expanded and demand for bandwidth has increased massively, the presence of these beacons in urban areas has become ubiquitous.

The emergence of global databases containing the known identities and positions of these communication beacons—primarily to support location services on mobile devices—has produced an expansive inventory of these radio signal sources. Positional accuracy of the features in such databases generally exceeds 30 meters and sample events (e.g., timestamps of location requests associated with specific beacons) are accurate to milliseconds.

An important aspect of some embodiments of the invention is that a beacon inventory database (such as a reference database of the location of known Wi-Fi access points compiled by the techniques set forth in the incorporated patents and applications) is maintained by constant and voluminous revists; it is typically read from and written to frequently. Sufficient location requests may be transacted with that database to ensure that urban areas are significantly sampled, both spatially and temporally. Modifications to the data tables may be automated to provide commercial levels of performance for mobile device users. Such automation provides mechanical, operationalized enforcement of data consistency.

The creation and maintenance of such a database provides a condition where subtle changes to beacon location and distribution are quickly detected and integrated into the overall signal composite. Applicants have currently (as of 2013) amassed a composite data set of multiple millions of individually mapped Wi-Fi and cellular beacons in all major global cities. The distribution of these beacon locations possesses shape and density that effectively mimics human development patterns and regions of high communication demand on the ground.

In order to refine these point aggregations to urbanized areas, the location data may be abstracted and discretized to polygonal or massed objects. Depending on clustering and modeling methods, the derived areas and volumes can model the built environment to building-level resolutions.

By recording and retaining versions or extracts of the beacon database over time to uniform and consistent standards, areal changes may be tracked and geographically quantified. This provides an opportunity to measure and monitor incremented progression of human extent and density through time.

Some embodiments of the invention include methods and systems for using radio signal characteristics to build and maintain accurate delineations of human built environments and for tracking changes to these environments. Some embodiments of the invention benefit from areas in which the majority of homes and businesses within the area of deployment utilize cell and Wi-Fi beacons for digital communication. At present (2013) this condition is met in nearly all of the world's electrified cities.

Radio beacon signal strength readings for cellular and Wi-Fi may be acquired so that the beacon source locations may be accurately inferred (using, for example, the techniques set forth in U.S. Pat. No. 7,433,694 B2.) Beacon references may be maintained in a database that accommodates ongoing additions, deletions and positional modifications (using, for example, the techniques set forth in U.S. Pat. No. 7,433,694 B2.)

Certain embodiments of the invention benefit from sufficient usage to consistently exercise database contents and maintain data quality over time. This usage permits the system to remain current and accurate in the location of known beacons, and permits it to self-heal against real world addition of new beacons, or the deletion or renaming of existing beacons (using, for example, the techniques set forth in U.S. Pat. No. 8,031,657 B2.)

Wi-Fi and cellular beacons are not distributed uniformly. Documented locations of these beacons create areas of varying feature density, or point clouds. The constituents of these point clouds also vary by acquisition date, logged activity, received signal strength and other attributes. In some embodiments of the invention, these point clouds may be abstracted into logical clusters by numerous geometric as well as attribute-based methods.

Various clustering mechanisms may be used for abstracting polygons from the point clouds, including density based adaptive tiling (using, for example, the techniques set forth in US 2008/0176583), kernel density graphing and vectorization to discrete class thresholds, Voronoi decomposition of points to polygonal classes, gridded feature counts, volumetric modeling using z-values from a beacon database, or other clustering techniques known to those of ordinary skill in the art.

Many of the resultant groupings may correspond to real world locations and associations that contain analytical or cultural relevance. An example of such a discretized space is a polygon describing the enclosed area where density of all functioning cellular and Wi-Fi beacons exceeds a given threshold (e.g., 250 beacons per square kilometer). An isoline imposed over a density graph at this threshold may properly define the limit of a highly urbanized area. Areas determined in this fashion with lower beacon densities may also be categorized, for example, as suburban or rural.

In well-sampled regions, beacon densities may achieve consistent levels across uniform development types. In the United States, suburban land comprising single-family homes on 0.5-acre lots may conform to a standard beacon density across this development type. In dense urban environments such as those comprising office and residential towers, beacon density may be related to building height and volume and may proxy for floor-to-area ratio (FAR) values. Place names and other semantic identifiers may be associated with these captured polygons using point-in-polygon intersections or other geometric proximity tests known to those of ordinary skill in the art.

Boundary thresholds may be isolated by using high quality, selectively available geographic features to train the detection algorithms. Data sources such as density of road segments, building footprints, utility connections, or photo-derived land use classes provide useful cues to match radio signal beacon density to a particular threshold. Areas with data of this type available may be considered training areas that may be used to calibrate the algorithms. These data may then be applied to other areas outside these training areas. In one example, a high-density signal cluster in an American city may correlate with an exact count of buildings contained within this cluster area, and thus a density per unit area value. Similar signal clusters in other cities may produce comparable signal-to-structure densities that may be averaged to characterize a uniform cultural development cohort.

Where significant variance exists in the sampling completeness of beacon data, density thresholds may be relaxed to normalize the area boundaries and provide comprehensive developed area delineations across disparate cultural and economic populations. For example, beacon density describing a development type in London, England at 250 beacons per $km^2$ may need to be relaxed when applied to Manila, Philippines, where fewer beacons are currently deployed per capita. Known correlations between human population densities and beacon densities may be used to estimate the human population density of other areas having similar beacon densities. Some embodiments of the invention use the geographic shape, distribution and change rate of these database additions and subtractions to describe and model real-world human land use. As digital communication becomes globally ubiquitous, this may provide an active and accurate measure of the extent of human civilization.

Figure 1:
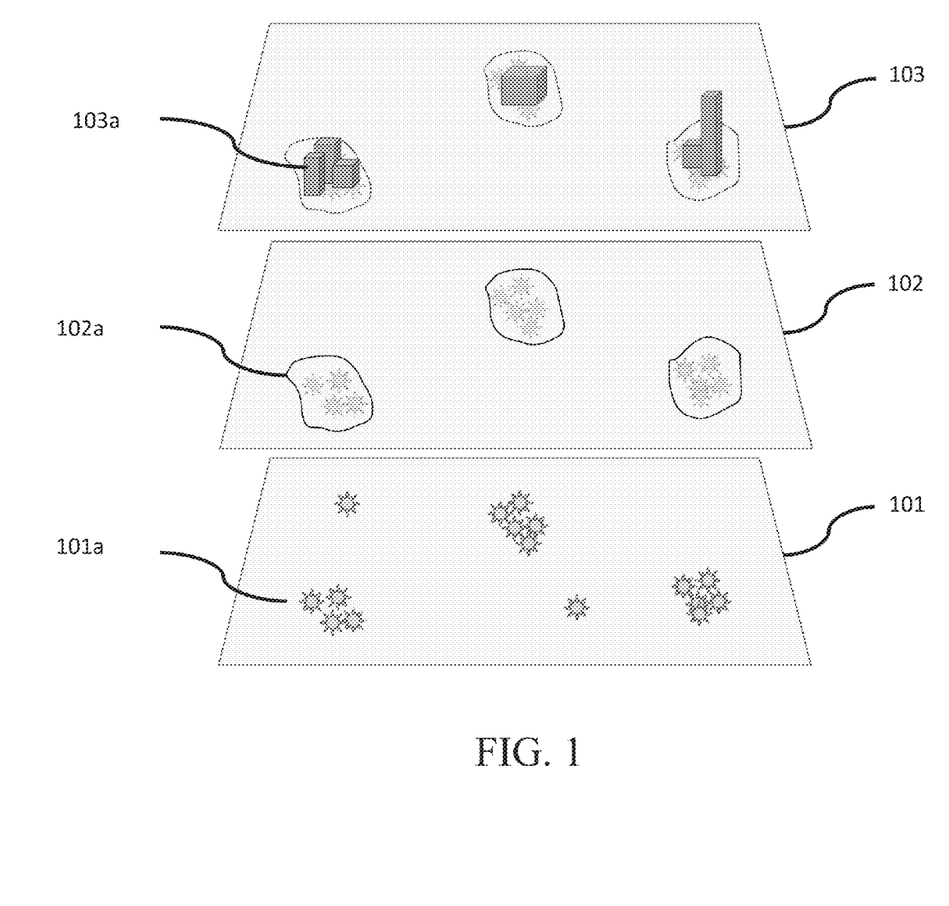
FIG. 1 is a representation of a map stack diagram illustrating data transformations in accordance with some embodiments of the invention.

FIG. 1 is a map stack diagram illustrating various map layers that may be used for radio beacon feature extraction in accordance with some embodiments of the invention. FIG. 1 includes a radio beacon layer 101 with individual radio beacons 101a, a super-positioned layer 102 with a density threshold 102a, and a development layer 103 with beacon-rich structures 103a. This map may be built by detecting individual radio beacons 101a and storing them on radio beacon layer 101. This layer may then be discretized by a density threshold 102a to produce isolines on the super-positioned layer 102. Finally, the isolines may be used to identify areas of densest development on the development layer 103, which may include a large, beacon-rich structure 103a.

Individual beacons 101a may be Wi-Fi access point locations, cellular beacon locations or geographically clustered combinations of beacons exhibiting common attributes. These points may be subsequently aggregated into density-defined groups in the super-positioned layer 102 of the stack. This may be accomplished by one or more clustering methods described above (e.g., density based adaptive tiling, gridded feature counting, etc.) to produce discrete, vectorized polygonal areas that adhere to specific geometric constraints. For example, any territory containing more than 250 beacons in an area measuring at least a single square kilometer may qualify as "dense urban." These territories may be shown in the development layer 103 as building masses within the vectorized high-density beacon areas.

Figure 2:
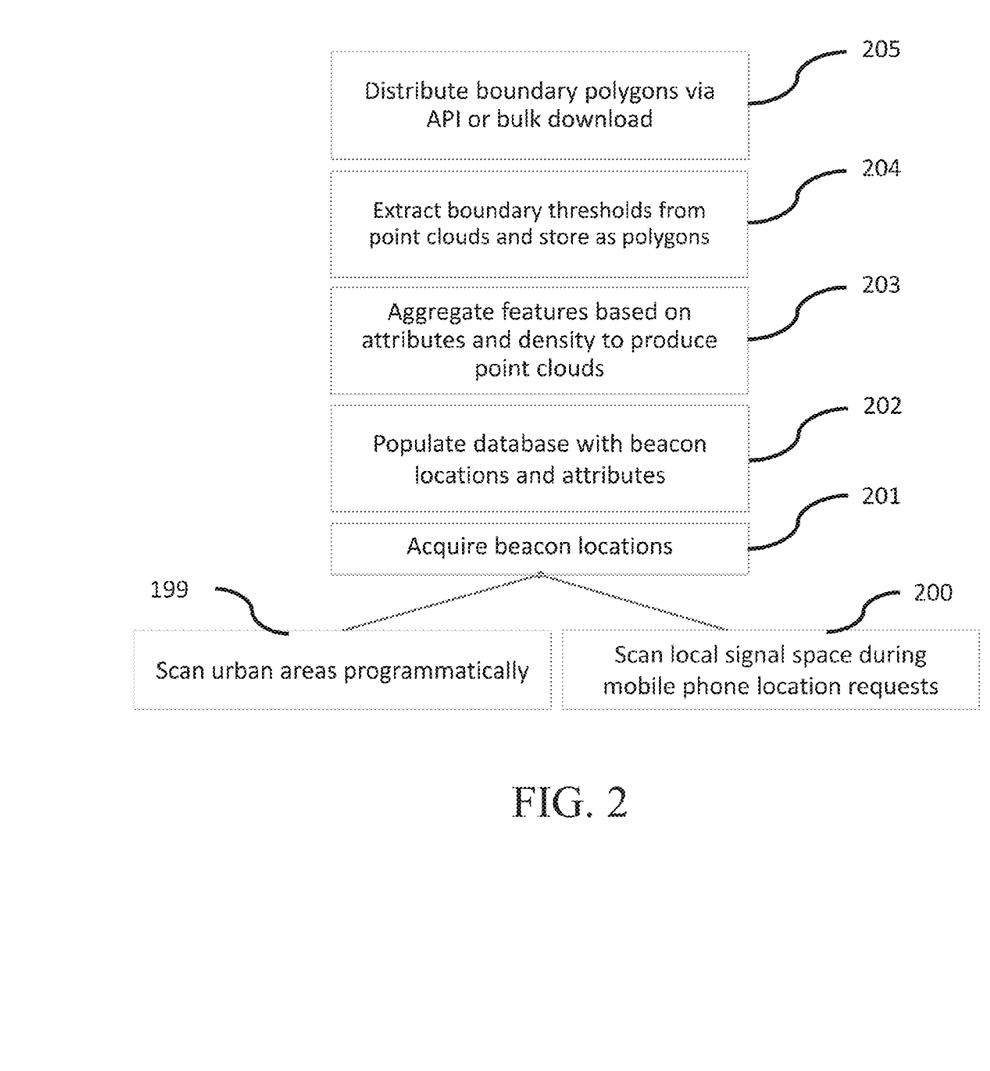
FIG. 2 is a flow diagram illustrating a method by which functioning beacons may be discovered and processed in accordance with some embodiments of the invention.

FIG. 2 is a flow diagram illustrating a method by which functioning beacons may be discovered and processed into demographically or culturally relevant polygonal boundary areas in accordance with some embodiments of the invention. This method generally operates by extracting boundaries, transforming the data, and distributing the data. More specifically, in step 201, beacon locations are collected. Beacons may be cellular or Wi-Fi signal sources that have been positioned from scanners operating from known locations. Beacon locations and attributes may be collected using programmatic, controlled scanning, as illustrated in Step 199, harvested from signals sent via mobile end user location requests, as illustrated in step 200, by other methods of collecting beacon locations known to those of ordinary skill in the art, or by any combination of these methods.

One method of collecting beacon locations is by scanning urban areas programmatically, as illustrated in step 199. For example, a programmatic scanning device placed in a scanning vehicle may be used. Such a scanning vehicle may be driven around regions of interest, such as urban areas, to collect beacon data and corresponding geographic positions. In Step 199, urban areas are scanned programmatically in order to provide the accurate and controlled signal capture in the dense or challenging environments. Acquisition of individual beacon signals using this methodology provides significant advantages, as consistent sampling may be undertaken on specifically chosen streets or in and around targeted structures using controlled scanning and positioning equipment and qualified personnel.

Another method of collecting beacon locations is by using data collected by mobile devices while scanning a local signal space during location requests, as illustrated in step 200. In Step 200, signal samples received by mobile devices from radio beacons and the geographic positions of the mobile device may be provided by the mobile devices. These mobile devices may be smartphones containing Wi-Fi, cellular and GPS radios. The position of radio beacons may be estimated based on the location of the mobile devices and the signal samples received from radio beacons. While collecting data in this fashion may be more difficult than programmatic scanning due to lack of control of the acquisition equipment and personnel, the massive number of mobile devices may, over time, serve as the equivalent of a global fleet of programmatic scanning devices. By late 2013, global active smartphones are estimated to exceed 1 billion units. This widespread deployment and use provides an unprecedented opportunity for sampling signals globally in a continuous, simultaneous fashion.

Once collected, these beacons and their resolved geographic locations are used to populate a beacons database in Step 202. In Step 203, the contents of this beacon database are then organized by geographic location (e.g., latitude, longitude pairs) and other identifying attribution (e.g., beacon identifiers) to produce spatially organized and clustered point clouds. In Step 204, boundary thresholds are applied to these sets and these geometric lines and polygons may then be distributed and integrated with any other data contained in a geographic information system. In Step 205, the boundary polygons may be distributed for use via an Application Programming Interface or via a bulk download of the information.

Figure 3:
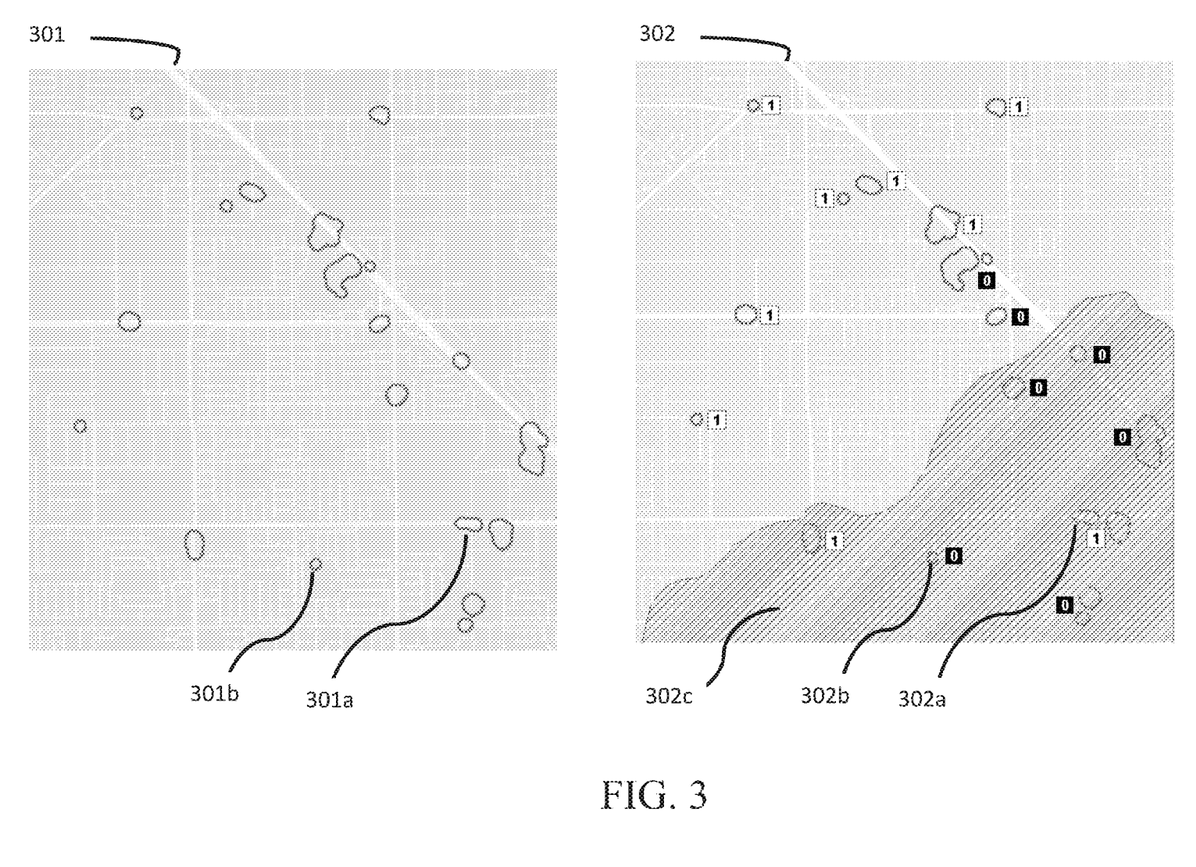
FIG. 3 is a representation of a technique for rapidly detecting neighborhood changes in accordance with some embodiments of the invention.

FIG. 3 illustrates a technique of rapidly detecting neighborhood changes by the use of a data composite derived from aggregated beacon density and type across a series of metropolitan areas in accordance with some embodiments of the invention. FIG. 3 illustrates a collection of metropolitan areas prior to an imminent flood 301, including metropolitan areas 301a and 301b. FIG. 3 also illustrates the same collection of metropolitan areas during a flood 302, including the same metropolitan areas 302a and 302b, and a flood zone 302c. These data may be composed of clusters combining Wi-Fi access point density and cellular beacon density, determined as described above and in FIGS. 1 and 2. Since both access points and cellular beacons are deployed to meet communication demand, their density graph serves as an effective proxy for the geographical distribution of this demand.

Some embodiments of the invention may be tuned to extract the highest activity communication nodes within a territory. Additionally, specific attributes of access point identifiers may be used for isolating venues or installations of different types. In combination with the density graph, these provide the ability to identify and monitor particular categories of clusters, such as campuses or hospitals.

Because the beacons database may be constantly used as a reference source for mobile devices requesting location, significant changes in request patterns may be used to determine whether the state of a neighborhood, campus or venue has changed appreciably in a given time increment. For example, during a flood this system may be used to track if any hospitals or other high activity installations in or around the vicinity of the flood zone 302c have lost electrical power. For example, it may be determined that metropolitan area 302b has lost power (symbolized in FIG. 3 as a "0") and that metropolitan area 302a is still operating (symbolized in FIG. 3 as a "1"). Rapidly making such determination may be of great use to emergency personnel during an event such as a flood.

The techniques and systems disclosed herein may be implemented as a computer program product with associated database(s) for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those of ordinary skill in the art may appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

What is claimed is:

1. A method of estimating at least one of a human development type and a population density, the method comprising:
   estimating, by a positioning system, positions of a plurality of radio broadcast beacons within a geographic area based on radio signals emitted from the plurality of radio broadcast beacons and received by one or more devices;
   storing, by the positioning system, the positions of the radio broadcast beacons in an electronically readable catalog;
   grouping each position of a corresponding radio broadcast beacon into sets of positions, wherein each set comprises positions of one or more geographically-related radio broadcast beacons within the geographic area;
   for each of the sets,
      determining a beacon density of the set, and
      estimating at least one of a human development type and a population density for an area encompassing the positions of the set based on the beacon density,
   wherein the human development type categorizes the area as at least one of urban, suburban or rural, and the population density indicates a density of human presence in the area.

2. The method of claim 1, wherein at least one of the positions of the plurality of radio broadcast beacons is estimated based on radio signals emitted from radio broadcast beacons received using a mobile scanning device.

3. The method of claim 1, wherein at least one of the positions of the plurality of radio broadcast beacons is estimated using data determined from radio signals received at a mobile device, said mobile device determining the data during a process for locating a geographic position of the mobile device.

4. The method of claim 3, wherein the data comprises the geographic position of the mobile device and a strength of a signal received by the mobile device from a radio broadcast beacon.

5. The method of claim 1, further comprising determining an attribute of one of the plurality of radio broadcast beacons other than position and storing the attribute in the electronically readable catalog.

6. The method of claim 5, wherein at least one of the sets is determined based on the attribute stored in the electronically readable catalog.

7. The method of claim 1, further comprising estimating a uniform human population density for a geographic area encompassing two or more of the sets, the uniform human population density exceeding a threshold density.

8. The method of claim 7, wherein the threshold density is determined based on population demographics associated with the geographic area.

9. The method of claim 7, wherein the threshold density is a previously detected density of radio beacons in a second geographic area having a particular land class.

10. The method of claim 9, wherein the particular land class is estimated using at least one of density of road segments in the area, number of utility connections in the area, or analysis of aerial photographs of the area.

11. The method of claim 1, wherein grouping each position comprises at least one of density based adaptive tiling, kernel density graphing and vectorization to discrete class thresholds, Voronoi decomposition, gridded feature counts, or volumetric modeling.

12. The method of claim 1, further comprising associating at least one of the sets with a named place in geographic proximity to the positions of the at least one set.

13. The method of claim 1, further comprising comparing the population density to a previously estimated population density for the area encompassing the positions of the set to determine if a difference between the estimated population density and the previously estimated population density exceeds a difference threshold.

14. The method of claim 1, wherein at least one of the sets includes only positions located within a single structure.

15. The method of claim 1, wherein estimating at least one of a human development type and a population density for each set comprises using a known correlation between human population densities and radio broadcast beacon density.

16. A system for estimating at least one of a human development type and a population density, the system comprising:
   a computer readable media including instructions that when executed by a computer system cause the computer system to:
   use a positioning system to estimate positions of a plurality of radio broadcast beacons within a geographic area based on radio signals emitted from the plurality of radio broadcast beacons and received by one or more devices and store the positions of the radio broadcast beacons in an electronically readable catalog;
   group each position of a corresponding radio broadcast beacon into sets of positions, wherein each set comprises positions of one or more geographically-related radio broadcast beacons within the geographic area;
   for each of the sets,
      determine a beacon density of the set, and
      estimate at least one of a human development type and a population density for an area encompassing the positions of the set based on the beacon density,
   wherein the human development type categorizes the area as at least one of urban, suburban or rural, and the population density indicates a density of human presence in the area.

17. The system of claim 16, wherein at least one of the positions of the plurality of radio broadcast beacons is estimated based on radio signals emitted from radio broadcast beacons received using a mobile scanning device.

18. The system of claim 16, wherein at least one of the positions of the plurality of radio broadcast beacons is estimated using data determined from radio signals received at a mobile device, said mobile device having determining the data during a process for locating a geographic position of the mobile device.

19. The system of claim 18, wherein the data comprises the geographic position of the mobile device and a strength of a signal received by the mobile device from a radio broadcast beacon.

20. The system of claim 16, the computer readable media further including instructions that when executed by the computer system cause the computer system to determine an attribute of one of the plurality of radio broadcast beacons other than position and storing the attribute in the electronically readable catalog.

21. The system of claim 20, wherein at least one of the sets is determined based on the attribute stored in the electronically readable catalog.

22. The system of claim 16, the computer readable media further including instructions that when executed by the computer system cause the computer system to estimate a uniform human population density for a geographic area encompassing two or more of the sets, the uniform human population density exceeding a threshold density.

23. The system of claim 22, wherein the threshold density is determined based on population demographics associated with the geographic area.

24. The system of claim 22, wherein the threshold density is a previously detected density of radio beacons in a second geographic area having a particular land class.

25. The system of claim 24, wherein the particular land class is estimated using at least one of density of road segments in the area, number of utility connections in the area, or analysis of aerial photographs of the area.

26. The system of claim 16, wherein the instructions that when executed by the computer system cause the computer system to group each position comprise instructions that when executed by the computer system cause the computer system to perform at least one of density based adaptive tiling, kernel density graphing and vectorization to discrete class thresholds, Voronoi decomposition, gridded feature counts, or volumetric modeling.

27. The system of claim 16, the computer readable media further including instructions that when executed by the computer system cause the computer system to associate at least one of the sets with a named place in geographic proximity to the positions of the at least one set.

28. The system of claim 16, the computer readable media further including instructions that when executed by a computer system cause the computer system to compare the estimated population density to a previously estimated population density for the area encompassing the positions of the set to determine if a difference between the estimated population density and the previously estimated population density exceeds a difference threshold.

29. The system of claim 16, wherein at least one of the sets includes only positions located within a single structure.

30. The system of claim 16, wherein the instructions that when executed by the computer system cause the computer system to estimate at least one of a human development type and a population density for each set comprise instructions that when executed by the computer system cause the computer system to use a known correlation between human population densities and radio broadcast beacon density.

* * * * *

UNITED STATES PATENT AND TRADEMARK OFFICE
CERTIFICATE OF CORRECTION

Page 1 of 1

PATENT NO.        : 9,612,315 B2
APPLICATION NO.   : 13/934717
DATED             : April 4, 2017
INVENTOR(S)       : Sutton et al.

It is certified that error appears in the above-identified patent and that said Letters Patent is hereby corrected as shown below:

In the Specification

Column 4, Line 56 should read:
voluminous revisits; it is typically read from and written to Column 6, Line 46 should read:
becomes globally ubiquitous, this may provide an active Signed and Sealed this
Eleventh Day of December, 2018

Andrei Iancu
*Director of the United States Patent and Trademark Office*